United States Patent Office 3,766,082
Patented Oct. 16, 1973

3,766,082
SINTERING OF COMPACTS OF UN, (U, Pu)N, AND PuN
Victor J. Tennery and Thomas G. Godfrey, Oak Ridge, and Edward S. Bomar, Knoxville, Tenn., assignors to the United States of America as represented by the United States Atomic Energy Commission
Filed Apr. 20, 1971, Ser. No. 135,730
Int. Cl. G21c 21/00; C01g 43/00
U.S. Cl. 252—301.1 R                    3 Claims

ABSTRACT OF THE DISCLOSURE

A method is provided for preparing a densified compact of a metal nitride selected from the group consisting of UN, (U, Pu)N, and PuN which comprises heating a green compact of at least one said selected nitride in the mononitride single-phase region, as displayed by a phase diagram of the mononitride of said compact, in a nitrogen atmosphere at a pressure of nitrogen less than 760 torr, which produces, at a given temperaure, a single-phase structure and a maximal sintered density as measured by mercury displacement.

BACKGROUND OF THE INVENTION

The invention described herein was made in the course of, or under, a contract with the U.S. Atomic Energy Commission.

The present invention relates to an improved process for sintering compacts of uranium mononitride by itself or in admixture or alloyed with higher nitrides of uranium or plutonium nitride.

One of the most economically desirable methods of manufacturing densified shapes of uranium nitride suitable for use as a nuclear fuel element is by cold pressing nitride powders followed by solid state sintering. Most of the prior-art efforts in sintering uranium mononitride of which we are aware have met with difficulty in achieving both homogeneous and dense compacts near or about 90% of the theoretical value (14.32 g./cm.$^3$). In cases where target densities are achieved, it has been accomplished at high sintering temperatures which are prone to result in a multiphase structure due to dissociation of the uranium mononitride. In sintering a material such as uranium nitride, it is most desirable to utilize conditions of temperature and pressure which reach a required density in a compact having a single-phase structure. In cases where high, i.e., within 90% of theoretical, density have been reported at sintering temperatures of 1500° C. or above, a nitrogen pressure of at least 1 atmosphere (760 torr), or in an inert gas atmosphere such as argon, has been used in attempts to minimize dissociation of uranium nitride during sintering. When sintering these mononitrides or other compounds which tend to decompose at elevated temperatures, the dual objects of maximum density and single-phase structure are mutually incompatible, for maximum densities are achieved for the most part under conditions which lead to excess dissociation or evaporation of uranium nitride.

DESCRIPTION OF THE INVENTION

It is accordingly an object of this invention to provide a process for production of sintered compacts of uranium nitride under conditions which result in a dense, single-phase microstructure. Our invention is predicated on the discovery that the bulk density as well as other properties of sintered uranium nitride is a unique and quite unexpected apparent function of the nitrogen pressure maintained over the compact during sintering. We find that when a uranium nitride compact is sintered within the uranium mononitride phase region, as displayed by a phase diagram of uranium nitride, maximum density is achieved at a minimal nitrogen pressure or partial pressure of nitrogen of at least an order of magnitude less than 760 torr nitrogen at temperatures of 1600° C. or greater.

Figure 1:
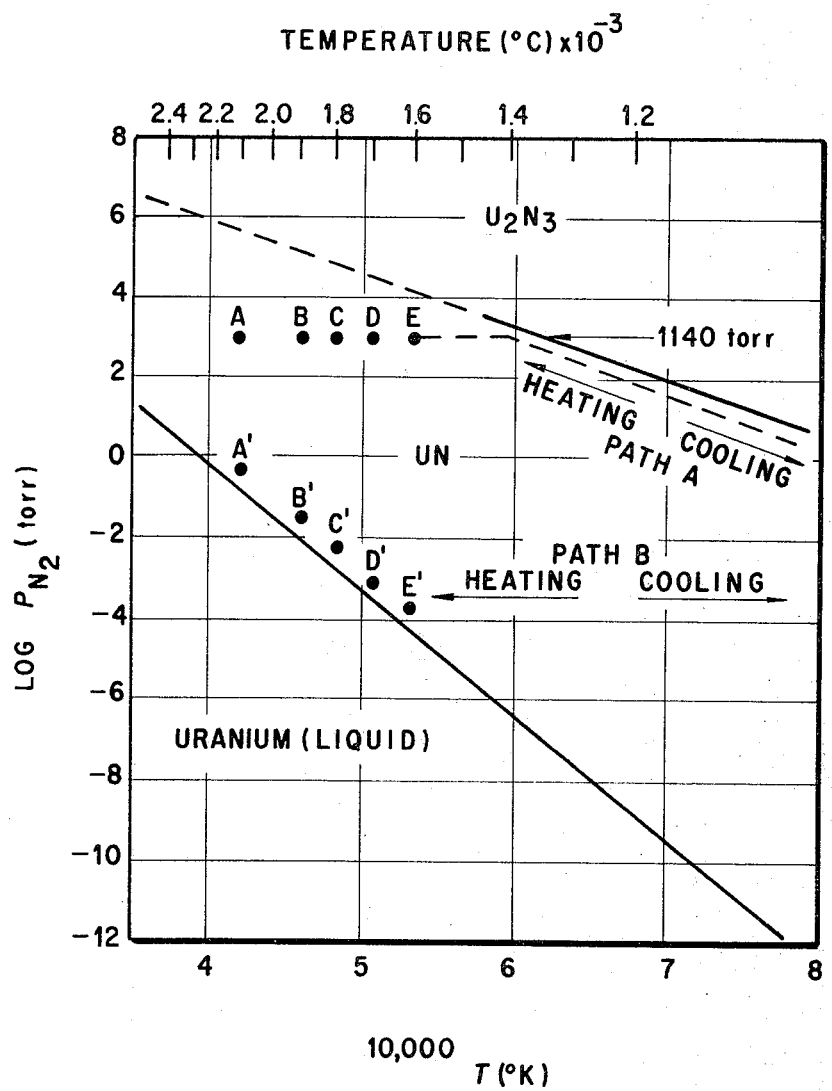
Figure 2:
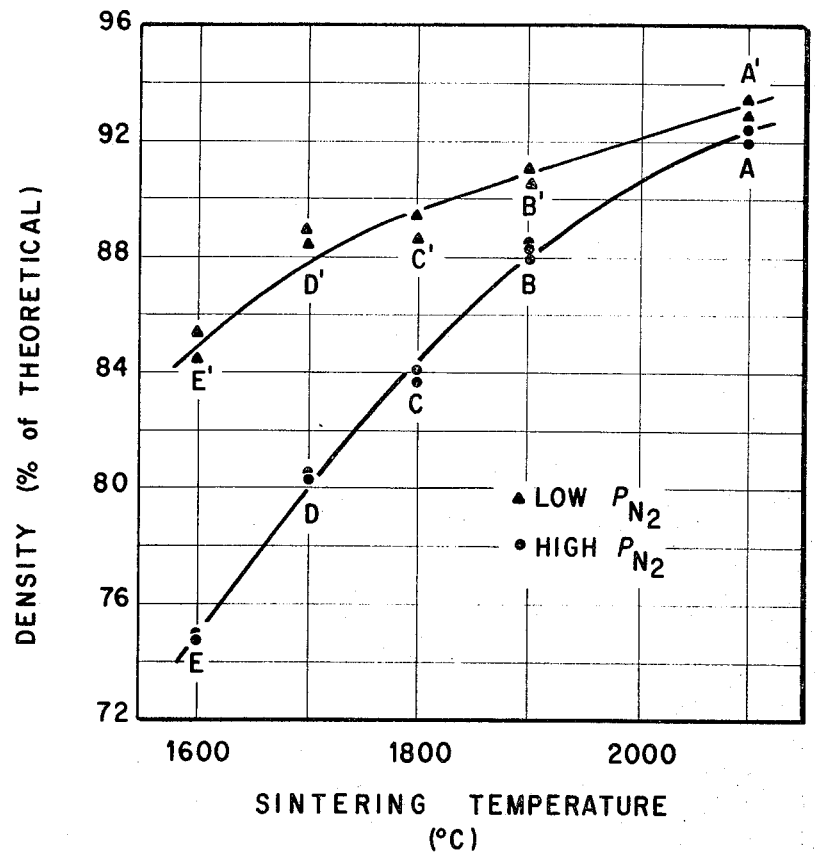
Figure 3:
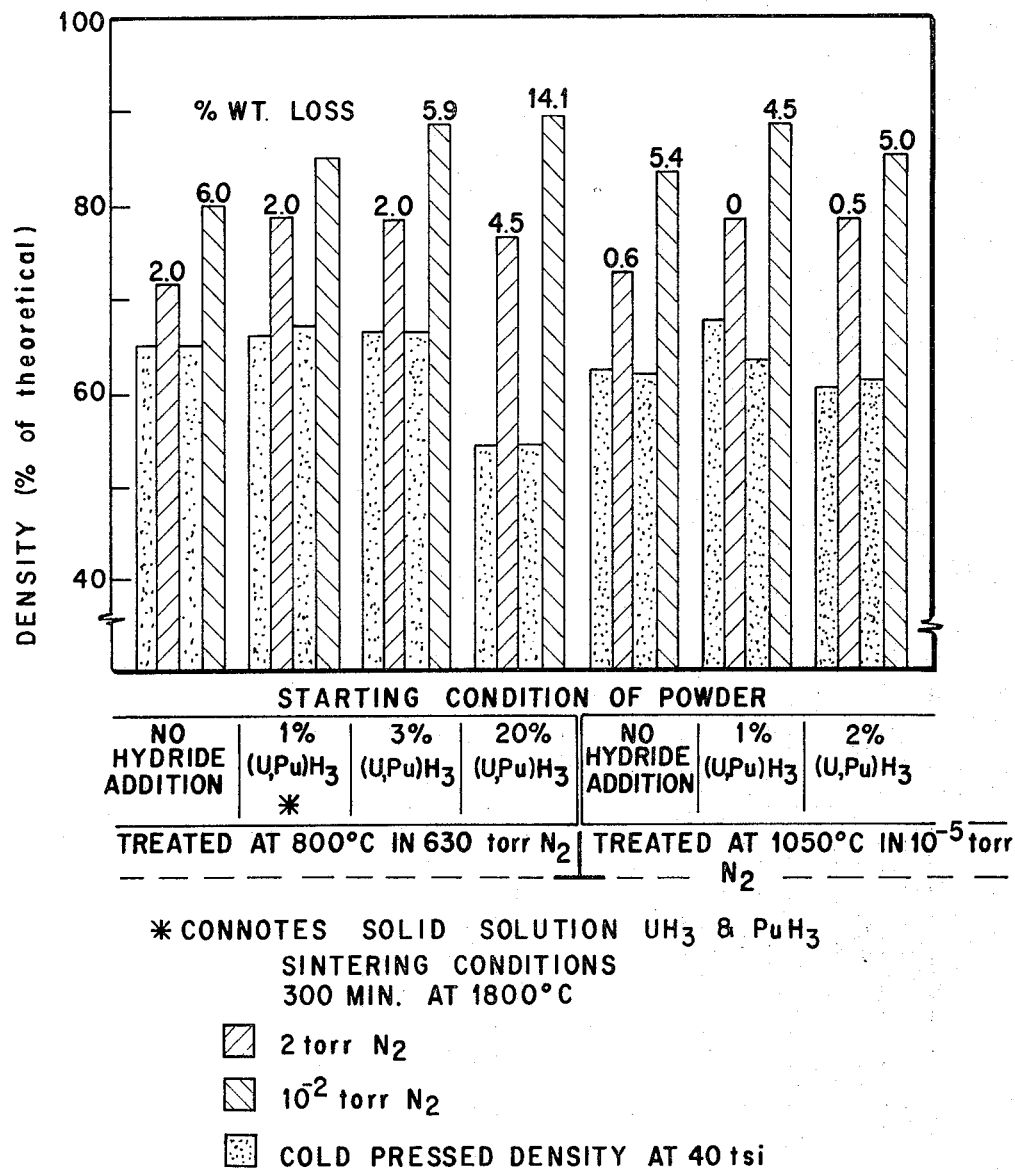
Figure 4:
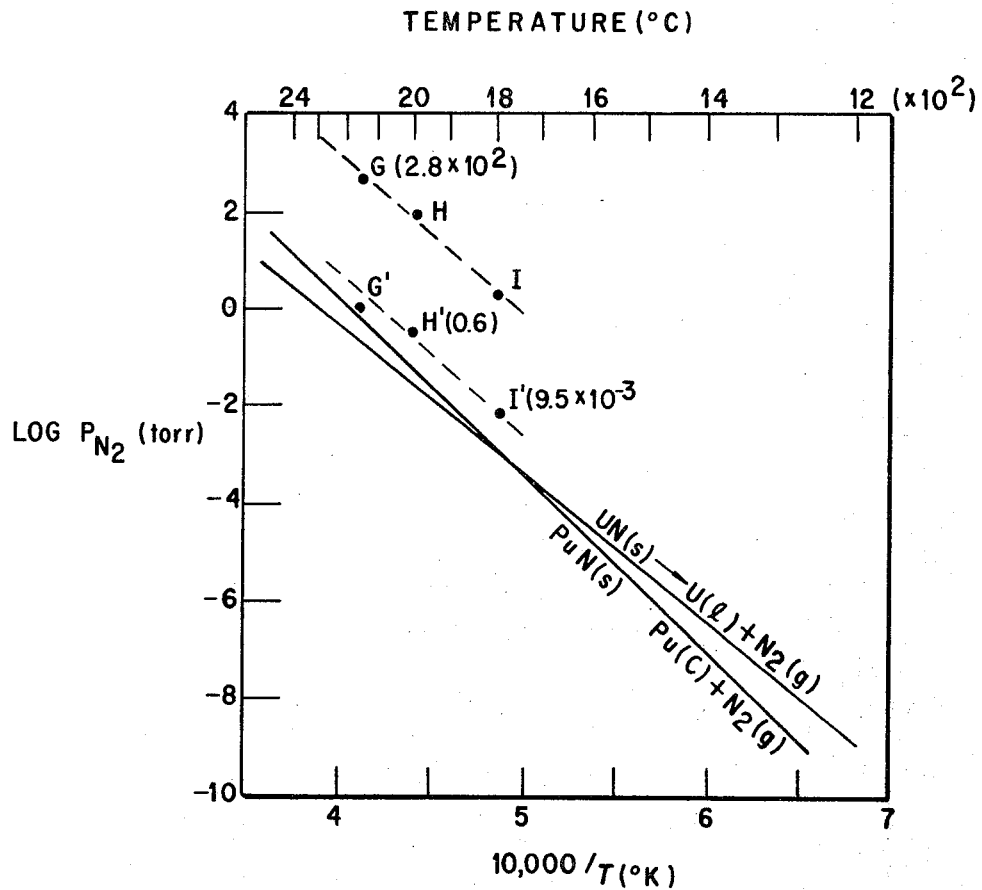
Figure 5:
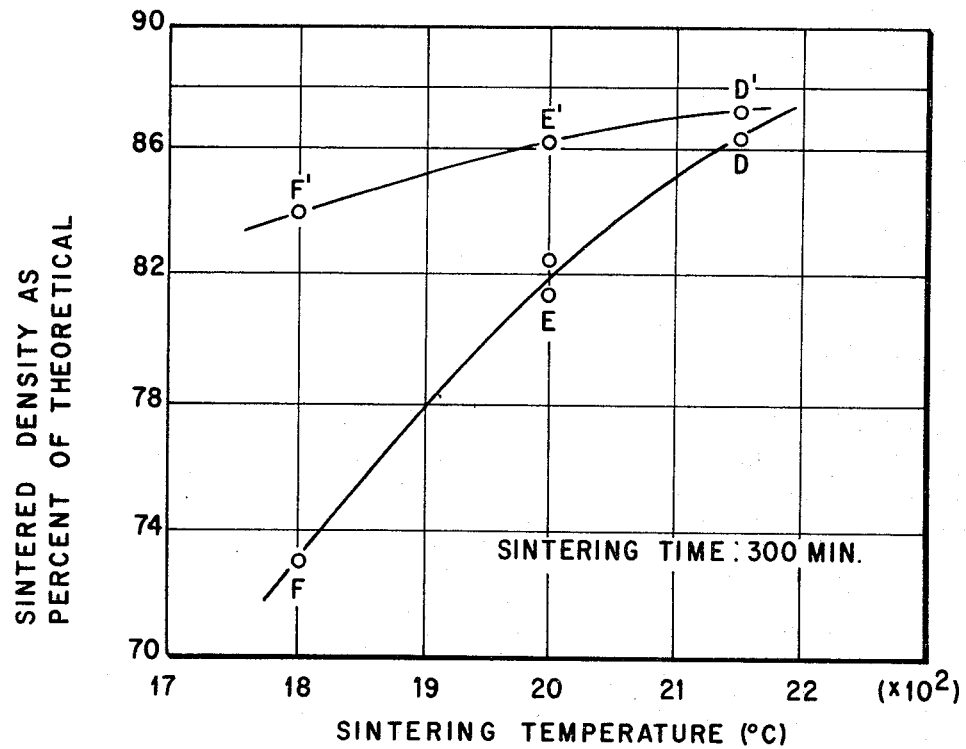

In the drawings FIG. 1 sets forth an area of a UN phase diagram showing heating and cooling paths experienced by two specimens of UN; FIG. 2 shows the bulk density of these UN specimens as a function of sintering temperature and nitrogen pressure; FIG. 3 is a bar graph showing the effects of hydride additions and nitrogen pressure in forming (U, Pu)N; FIG. 4 is a plot of sintering temperature versus nitrogen pressure for (U, Pu)N in the absence of a hydride additive; and FIG. 5 is a plot of sintering density of UN as a function of sintering temperature showing the effects of nitrogen pressure.

FIG. 1 shows the pertinent area of the UN phase diagram in a plot of log of nitrogen pressure vs. temperature on which are superimposed two heating and cooling paths A and B experienced by two sets of green compacts of UN. Specimens A to E, inclusive, were sintered at the indicated temperatures (path A), all at a nitrogen pressure of 1140 torr; specimens A' to E', inclusive, were all sintered at temperatures along path B, but at a nitrogen pressure at least 3 orders of magnitude lower than unprimed specimens conducted along path A.

The bulk density of the specimens, as measured by means of a vacuum pycnometer with mercury as the displacement fluid at a mercury pressure of about 600 torr, is shown in FIG. 2. The data of FIG. 2 show that the bulk density of sintered specimens of UN is strongly dependent upon the nitrogen pressure with reduced nitrogen pressures exhibiting an enhanced sintering at a given temperature.

The greatest difference in density between specimens at a given temperature occurred at the lower sintering temperatures. By reference to the data in FIGS. 1 and 2 for specimens E and E' it is seen that a seven-order difference in pressure at 1600° C. produces a higher density at the lower nitrogen pressure. A three-order difference in pressure at a temperature of 2100° C. led to a higher sintered density for specimen A', sintered at low nitrogen pressure, as compared to specimen A, sintered at high nitrogen pressure.

According to densities recorded in FIG. 2, specimens B' (1900° C.) and A (2100° C.), B (1900° C.) and D' (1700° C.), C (1800° C.) and E' (1600° C.) had essentially the same bulk density. The data illustrate the remarkable and unexpected finding that the same sintered density can be achieved with a temperature lower by 200° C. at low nitrogen pressures. Moreover, the microstructures of the two sets of specimens were essentially identical even though the sintering temperature differed by 200° C. The result is termed remarkable and unexpected in the light of general teaching that higher temperatures produce higher sintered densities.

Weight measurements revealed that the sintered samples were undergoing a weight loss. For example, samples A' through D' apparently exhibited congruent evaporation of UN even though sintering took place within the UN phase region. That dissociation of the UN was not the cause of the weight loss was confirmed by examination of metallographic sections which did not show a secondary phase attributable to free uranium.

In order to reduce loss of UN, we propose, as a modified version of the "low nitrogen" process of this invention, to supplement the sintering atmosphere with a partial pressure of an inert gas such as argon.

The value of operating with a partial pressure of inert gas is revealed by an experiment in which three groups of UN specimens were sintered at about 2000° C. for densities, whereas Group 1 had a significantly lower density two hours. These groups are designated as 1, 2, and 3 in Table I below.

TABLE I

[Data for UN sintered 2 hr. at 2,000° C.]

| Specimen group | Temperature (° C.) | Sintering condition | | Density (percent of theoretical) | Average weight loss (percent) |
|---|---|---|---|---|---|
| | | Gas | Pressure (torr) | | |
| 1 | 1,990 | $N_2$ | 1,140 | 88.8 | 1.79 |
| 2 | 2,015 | $N_2$ | $10^{-1}$ | 92.5 | 4.62 |
| 3 | 1,975 | $\{N_2 \atop Ar\}$ | $\{10^{-1} \atop 1,140\}$ | 92.2 | 2.22 |

Group 1 was sintered under the same atmospheric conditions as were specimens A through E, but Group 2 was sintered under nearly the same conditions used for specimens A' through E'. The sintered density for Group 2 agreed well with the plot shown for specimens A' through E' in FIG. 2, and the value for Group 1 fell slightly below the expected value deduced from the data for specimens A through E. Group 3 was sintered under the same partial pressure of nitrogen used for Group 2, but the total pressure was adjusted to 1140 torr by the use of argon. Groups 2 and 3 achieved essentially the same sintered densities, whereas Group 1 had a significantly lower density. It is also seen that the weight loss observed in Group 2 by evaporation of UN was reduced by a factor of seven by an overpressure of argon during sintering, but the sintering activity in terms of finally attained density was unaffected. Our experience has shown, therefore, that the tendency of the UN to volatilize at high temperature and reduced nitrogen pressure can be largely suppressed by maintaining a partial pressure of at least about 1 atmosphere of inert gas during sintering.

Uranium nitride powder used in practicing the improved sintering process of this invention was produced from uranium in massive (sheet or bar) form by a hydride-dehydride-nitride sequence as follows:

The surface of the metal was cleaned by immersion in a 1 M solution of nitric acid. After removal of oxide contaminants, the uranium metal was washed with absolute alcohol and transferred into a reaction chamber located in a glove box filled with purified argon. The uranium in the reaction chamber supported by a number of tungsten grate rods was treated in a number of hydride-dehydride cycles to convert the massive uranium to a fine powder mass. In a typical cycle the massive piece was exposed to a hydrogen pressure of 760 torr at a temperature in the range 200–250° C. until the surface was hydrided. As the hydride formed, it fragmented from the surface due to the change in density between the metal and hydride. At the same hydrogen pressure, the hydride was then heated at a temperature in the range 300–350° C. to effect conversion to uranium powder.

After the requisite number of hydride-dehydride cycles, the charge was left in the hydride form whereupon the atmosphere in the reaction chamber was changed to nitrogen and the temperature raised to a dehydriding temperature of 300° C. for a period of 2–4 minutes. The temperature was then decreased to about 250° C. to allow the small amount of free uranium produced from the dehydriding reaction to convert to nitride. The temperature was then cycled back to the dehydriding temperature, allowing further increments of free uranium to react, increasing the temperature of each succeeding nitriding cycle by about 15° C. to a final nitriding temperautre of 500° C. until the entire charge had been smoothly converted to a nitrogen-rich sesquinitride powder. This powder was then heat-treated under vacuum at a temperature in the range 900–1000° C. to convert the powder to primarily the mononitride. A higher nitriding temperature was found to lower sintering activity. Analysis of the nitride powder using a Micromerograph (Sharples Corp., Bridgeport, Pa.) showed 90% less than 10 micrometers ($\mu$m.), 50% less than 5 $\mu$m., and 10% less than 2 $\mu$m.

Green compacts of the nitride powder as produced above were isostatically pressed at 60,000 p.s.i. maintained for about 2 minutes and then sintered according to sintering schedules previously described.

Thus far, we have disclosed the invention in terms of a process for sintering UN compacts at "low" pressures or partial pressures of nitrogen to achieve a single-phase densified structure where the higher density, at a given temperature, is obtained at the low nitrogen pressure, a result which runs counter to the normal expectation in powder compaction technology. By practicing our invention, a target density is now achievable at a lower temperature than would normally be expected. Sintering at the lower temperature results, in turn, in reducing the tendency to produce adverse reactions in the sintering body which produce a heterogeneous multiphase as against a more desirable homogeneous single-phase structure. The economies realized by operating furnaces at temperatures lower by about 200° C. to achieve the desired result involve an additional significant advantage resulting from our invention. And, while we discuss the advantage achievable by our invention in qualitative terms by calling for a low overpressure of nitrogen in the sintering atmosphere, the distinction between a high nitrogen pressure as opposed to a low pressure will be evident in the light of this disclosure by one skilled in the art. Thus, while it is known to sinter at 1 atmosphere of nitrogen, the present invention calls for a nitrogen pressure lower by at least about three orders of magnitude to achieve an unexpected increased density at a given sintering temperature.

One of the most unexpected findings resulting from our invention is that the electrical resistivity and Neél temperature of the compacts produced at low nitrogen pressure are very different from compacts sintered at high (i.e., 760 torr or greater) nitrogen pressure. Neél temperature is the temperature at which a material changes from a paramagnetic to an antiferromagnetic state.

The ratio of the electrical resistivity of a solid at 273° K. to that at liquid helium temperature, 4.2° K., is a measure of the density of the scattering centers in the solid for the electrical conduction process in the material. A low ratio indicates that the solid contains many scattering centers and a high ratio indicates that the solid contains fewer scattering centers. No simple experimental method presently exists for quantitatively measuring the number of these scattering centers or identifying specifically what they are. Such as in the case of UN, they could be uranium vacancies or interstitials or nitrogen vacancies or intestitials.

We have measured the ratio $\rho 273° K./\rho 4.2° K.$ for the UN sintering samples shown in FIGS. 1 and 2 as well as samples sintered at 2000° C. The results were as shown in Table II.

TABLE II

[Electrical resistivity ratios ($\rho$) of sintered UN samples]

| Specimen | Sintering temp., ° C. | $P_{N_2}$ | $\rho 273° K./\rho 4.2° K.$ |
|---|---|---|---|
| A | 2,100 | 1,140 torr | 94 |
|   | 2,000 | do | 114 |
| B | 1,900 | do | 127 |
| C | 1,800 | do | 158 |
| D | 1,700 | do | 149 |
| E | 1,600 | do | 130 |
| A' | 2,100 | Low | 34 |
|   | 2,000 | Low | 33 |
| B' | 1,900 | Low | 33 |
| C' | 1,800 | Low | 33 |
| D' | 1,700 | Low | 34 |
| E' | 1,600 | Low | 35 |

These data show that the UN specimens which sintered more readily due to the low $P_{N_2}$ at temperature contain more scattering centers than do those sintered under 1140 torr of $N_2$.

Quantitative chemical analyses of the sintered samples were used to determine the composition. These analyses showed that UN samples sintered at a given temperature had essentially the same chemical composition regardless of the nitrogen pressure used, i.e., low $P_{N_2}$ or high $P_{N_2}$.

A small decrease in total nitrogen content was observed as the sintering temperature was increased from 1600° C. to 2100° C. (see Table III).

TABLE III

[Chemical contents of UN specimens after sintering]

| Specimen | Sintering temperature (° C.) | Composition, wt. percent | | | |
|---|---|---|---|---|---|
| | | Uranium | Nitrogen | Other elements* | Sum of nonmetals |
| A | 2,100 | 94.61 | 5.40 | 0.097 | 5.497 |
| A' | 2,100 | 94.60 | 5.38 | 0.097 | 5.477 |
| E | 1,600 | 94.52 | 5.45 | 0.077 | 5.527 |
| E' | 1,600 | 94.49 | 5.42 | 0.177 | 5.537 |

* Includes oxygen content plus 470 p.p.m. carbon. Theoretical nonmetal content of $^{238}U^{14}N = 5.556\%$.

These results show that, whatever the scattering centers are which lead to improved sintering in UN, their influence on the gross chemical composition is not detectable by present analytical methods.

The normal accepted Néel temperature for UN is close to 50° K. We have measured the Néel temperature of samples C and C' and also have treated sample C under reduced $P_{N_2}$, measured the Néel temperature, then treated it at high $P_{N_2}$, and have remeasured the value. The results are given in Table IV.

TABLE IV

[Changes observed in properties of a specific UN sample sintered at 1800° C. Due to annealing in nitrogen at high and low pressure]

| Sample | $\rho 298° K./\rho 4.2° K.$ | Néel temperature (° K.) |
|---|---|---|
| C (high $P_{N_2}$) | 158 | 52 |
| C (low $P_{N_2}$) | 27 | 55 |
| C (high $P_{N_2}$) | 159 | 52 |

These results demonstrate that the defect state imparted to the UN by sintering in a given nitrogen pressure is a reproducible state. It is the high defect state in UN which leads to the improved sintering. Also, the presence of the defects causes a reproducible change in the Néel temperature and the antiferromagnetic coupling is stronger in the UN containing more defects (low $\rho$ ratio) since this material has a higher transformation temperature to the disordered or paramagnetic state.

The advantages in practicing this invention are applicable to other actinide nitrides; for example, plutonium nitride and mixtures of plutonium nitride with uranium nitride. Sintering mixtures of PuN and UN presents a particularly vexing problem. At sintering temperatures, the vapor pressure of plutonium over PuN is considerably greater than is the pressure of uranium over UN at the same temperature. Thus, in solid solutions of these compounds, the pressure of plutonium tends to be dominant at very high temperatures. This frequently results in the selective loss of plutonium from the compact during the sintering operation. Therefore, the sintering process which permits the use of the lowest temperature provides a distinct advantage.

To investigate the effect of low nitrogen overpressure on the sintering of nitrides containing plutonium, $(U_{0.81}Pu_{0.19})N$ powder was prepared from an alloy of uranium and plutonium. The designation (U, Pu)N represents a solid solution of UN and PuN at a given concentration ratio. The mononitride (U, Pu)N was prepared by the hydride-dehydride-nitride process, as described above, with final treatment at 1050° C. and $10^{-5}$ torr $N_2$. The sesquinitride material was made by heating the (U, Pu)N to 800° C. under 630 torr $N_2$. Pellets were prepared from both of these nitride powders by uniaxially pressing at 80,000 p.s.i. in a steel die. In order to measure the effect of a hydride addition, 1,3, and 20 weight percent of $(U_{0.81}Pu_{0.19})H_3$ was added to the powder and another set of pellets was fabricated. The green compacts were sintered at two pressure levels of nitrogen, 2 torr and $10^{-2}$ torr, 5 hours at 1800° C. within the single-phase region of UN and PuN as displayed by their respective phase diagrams. The results are summarized in the bar graph of FIG. 3. It will be seen that higher (from 7 to 10%) densities were obtained at the lower nitrogen pressure. The same pattern of increased density at the lower nitrogen pressure was obtained with (U, Pu)N and (U, Pu)N plus $U_2N_3$ as the starting powder. The hydride additions increased the resulting sintered density about 5 percent. The inclusion "hydride" as an aid in maximizing density loses some of its value when amounts greater than about 3 percent are used because it leads to excessive congruent vaporization of nitride.

FIG. 4 represents a set of conditions used in experiments on sintering $(U_{0.81}Pu_{0.19})N$ without the use of a hydride additive. Points G, H, and I represent a set of high-pressure conditions used to sinter compacts of $(U_{0.81}Pu_{0.19})N$. Points G', H', and I' represent a set of low-pressure conditions. The enhanced sintered densities obtained under the lower nitrogen pressures are markedly evident from the curves of FIG. 5. Moreover, the density increase was not due to dissociation to free metal, since metallographic examination of the structure of the compacts did not reveal the existence of free metal. Thus, we have shown the advantages of sintering at low pressure of nitrogen realized with PuN-containing compacts.

What is claimed is:

1. A method for preparing a densified compact comprising UN which comprises sintering, at a temperature in the range 1550–2200° C., a green compact of said UN under a nitrogen pressure no greater than about 1 torr above the dissociation pressure of UN to a produce a sintered compact having a Néel temperature of at least 55° K. and a ratio value of electrical resistivity at 273° K. to the electrical resistivity at 4.2° K. of no greater than 35.

2. A method for preparing a compact of a metal nitride selected from the group consisting of UN, (U, Pu)N, and PuN which comprises sintering a green compact of said selected nitride at a temperature in the range 1550°–2200° C. in a gaseous mixture of nitrogen and argon at a partial pressure of nitrogen no greater than about 1 torr above the dissociation pressure of said selected nitride.

3. The method according to claim 2 in which the green compact to be sintered contains from 1 to 3 weight percent of a hydride of the metal nitride of said compact.

References Cited

UNITED STATES PATENTS

| 3,345,436 | 10/1967 | Craig | 264—0.5 |
| 3,306,957 | 2/1967 | McLaren | 264—0.5 |
| 3,471,314 | 10/1969 | Beatty et al. | 264—0.5 |
| 3,213,161 | 10/1965 | Craig | 264—0.5 |
| 3,294,877 | 12/1966 | Hammon | 264—0.5 |

FOREIGN PATENTS

| 1,064,224 | 4/1967 | Great Britain | 264—0.5 |
| 1,079,042 | 8/1967 | Great Britain | 264—0.5 |

CARL D. QUARFORTH, Primary Examiner

R. S. GAITHER, Assistant Examiner

U.S. Cl. X.R.

260—0.5; 423—254